United States Patent Office 3,034,968
Patented May 15, 1962

3,034,968
PROCESS FOR PREPARING VIABLE DRY BACTERIA AND MOLDS
William R. Johnston, Chappaqua, N.Y., assignor to Standard Brands Incorporated, New York, N.Y., a corporation of Delaware
No Drawing. Filed Apr. 9, 1959, Ser. No. 805,147
18 Claims. (Cl. 195—98)

The present invention relates to a novel process for preparing viable dry bacteria and molds.

Living microorganisms, such as bacteria and molds, are extremely delicate and sensitive to changes in environment. Nature provides some microorganisms with a mechanism, namely sporulation, whereby they can withstand unfavorable environmental conditions. Other microorganisms exist only in the vegetative (non-sporulated) form and are much more delicate and sensitive. Since undried bacteria and molds in the vegetative form normally contain large amounts of water, any treatment which substantially reduces this water content affects the life processes of the cells and may result in the weakening or death of many of the cells. Drying of bacteria and molds without killing them requires that the intracellular water pass through the cell membrane in such a manner that the vitality of the organism will not be seriously impaired. Thus, it is not surprising that drying processes which have been found to be satisfactory for dehydrating nonliving materials have been found to be unsuitable for drying vegetative bacteria or molds since they partially or completely destroy the vitality of the organism.

It has long been a goal of the microbiologist to prepare bacteria and molds in a dry, highly viable, stable form since this form offers many obvious advantages. For instance, the maintenance of cultures for laboratory and industrial use is greatly simplified if they are preserved in the dry form. Also, when bacteria and molds are reqired for industrial use in relatively large amounts, there is a great advantage in being able to provide a stock of dry viable bacteria and molds available when needed in the quantity required.

Several procedures have been used to dry microorganisms. Perhaps the simplest approach involves allowing microorganisms to dehydrate in situ on a nutrient agar slant by exposure to air. However, the viability of microorganisms dried in this manner is very low unless they are bacteria or molds capable of forming spores.

Another conventional drying process which has been used for drying microorganisms is drum drying. In this process a thin layer of an aqueous suspension of the microorganism is dried on a rotating drum heated indirectly, for instance by steam, while under atmospheric or sub-atmospheric pressure. While this process accomplishes the efficient dehydration of the microorganism, the vitality of the microorganism is substantially completely destroyed.

Another conventional drying process which has been applied to drying microorganisms is spray-drying. In that process an aqueous suspension of the microorganism is sprayed into a stream of hot air. As in the case of drum drying, the dehydration of the microorganism is accomplished efficiently, but the resulting dry product is substantially without vitality. The only exceptions appear to be the spores of certain microorganisms. According to Bullock and Lightbown (Quart. J. Pharm. and Pharmacol., vol. 20, p. 313, 1947) more than 90% of the spores of *Bacillus subtilis* survived spray drying whereas less than 0.4% of the cells of *Bacterium lactis aerogenes*, which does not sporulate, survived spray drying. Also, Mazur and Weston (J. Bact., vol. 71, p. 257, 1956) reported that more than 80% of the spores of the two molds *Aspergillus flavus* and *Pestalotia palmarum* survived spray drying. In this connection it is to be noted that most bacteria do not form spores and, while most molds do form spores, the spores constitute only a small proportion by weight of the mold mass, the balance being vegetative supporting structures known as mycelia.

Another drying process which has often been found to be particularly effective for drying heat sensitive materials, including certain microorganisms, blood and blood plasma, and certain medicinal chemicals, such as penicillin, is freeze-drying, generally referred to as lyophilization. This process consists of freezing an aqueous solution or suspension to be dried and then subliming the moisture from the frozen mass under vacuum without permitting the mass to undergo melting. Lyophilized microorganisms tend to have low viability except in a few cases where specific protective media were developed for individual microorganisms and they were dried in the presence of these media. For instance, Naylor and Smith (J. Bact., vol. 52, p. 565, 1946) reported that less than 5% of the cells of *Serratia marcescens*, a non-sporulating bacterium, survived lyophilization when no protective medium was used whereas 100% of the cells survived lyophilization when a protective medium composed of thiourea, ascorbic acid, ammonium chloride and dextrin was used. Also, Record and Taylor (J. Gen. Microbiol., vol. 9, p. 465, 1953) reported that less than 1.4% of the cells of *Escherichia coli*, a non-sporulating bacterium, survived lyophilization when no protective medium was used whereas 51% of the cells survived when they were dried in a medium containing glucose and an exudate from *Escherichia coli*. The high cost of freeze-drying makes it impractical for large scale commercial operation.

It is an object of the present invention to overcome the shortcomings of the prior art processes for drying bacteria and molds.

It is also an object of the present invention to provide a novel process for preparing viable dry bacteria and molds.

It is an additional object of the invention to provide a process for drying bacteria and molds with high retention of their viability and functional activity.

The above enumerated objects, as well as other objects, together with the advantages of the invention, will readily be comprehended by persons skilled in the art upon reference to the following description.

In accordance with the process of the present invention, bacteria and molds containing various amounts of moisture are dried by suspending them in a liquid oil or equivalent non-deleterious liquid and evaporating moisture from them while they are suspended in said liquid. Evaporation of the moisture is desirably facilitated by bringing the suspension of the microorganism in the liquid into intimate contact with a gas, for example air and nitrogen, which is not deleterious to the microorganism or the suspending liquid, for instance, by bubbling the gas through the suspension or by spraying the suspension into the gas.

The liquid medium in which the microorganism is suspended may be any substance which is liquid at the drying temperature both in the presence and the absence of water, has no deleterious effect upon the microorganism and from which water can be removed by the methods hereinafter described. Whether a given liquid would be suitable can be determined by a simple experiment. It is sufficient to simply mix the microorganism with the liquid and allow the microorganism to remain in contact with the liquid for a short period, say fifteen minutes to one hour, separate the microorganism and then determine by standard procedures whether its viability has been seriously reduced. Advantageously the suspending liquid is water-immiscible and is not as volatile as water. Most suitable are the oils of vegetable, animal or mineral origin. Best results to date have been obtained with corn oil. Other suitable glyceridic vegetable oils are soybean, cottonseed, rice and peanut oils. Animal oils, for example butter oil and sperm whale oil, may be employed. Mineral oils, either light or heavy, which are of a hydrocarbon nature, are also suitable. Other equivalent suspending liquids will be apparent to those skilled in the art. In case it is desired to prepare an edible dried microorganism or the microorganism is to be used to prepare edible products, an edible suspending liquid may be used.

The suspending media useful in the present invention vary in their ability to maintain microorganisms in suspension. With some suspending media and under some drying conditions there may be a tendency for the suspended microorganisms particularly bacteria to agglomerate even though the suspension is agitated vigorously by aeration. In such cases it is advisable to employ a nondeleterious dispersing or wetting agent to keep the microorganisms suspended while they are being dried. Among the dispersing and wetting agents which have provided satisfactory results are lecithin, for instance the products sold under the trademarks "Gliddophil SP" and "Alcolec," sorbitan monooleate, which is sold under the trademark "Span 80," sorbitan monolaurate ("Span 20"), sorbitan monostearate ("Span 60"), phosphorylated lecithin ("Alcolec HO"), diacetyltartaric acid ester of 95% lard monoglyceride ("TEM"), and the product sold under the trademark "Emocithin G" which is an emulsifying agent of the type described in U.S. Patent No. 2,552,706. Crude vegetable oils, for instance, crude corn oil, are also suitable, probably because they contain phospholipids such as lecithin or other dispersing or wetting agents. Other equivalent dispersing or wetting agents suitable for the purpose will be apparent to those skilled in the art. Care should be exercised not to add too much dispersing or wetting agent because this may lead to the formation of extremely small dried particles which are difficult to separate from the oil or other suspending medium.

The commercially available refined corn oil was used as a suspending medium in the examples hereinafter given. While crude corn oil or other crude vegetable oils may be used as suspending media, they may give dried products of extremely fine particle size which are difficult to separate from the oil. This is probably due to the fact that crude vegetable oils naturally contain a relatively large amount of dispersing or wetting agents such as phospholipids. These agents are largely removed in the commercial refining operations. The commercially available refined vegetable oils vary somewhat in composition including probably their content of dispersing and wetting agents. Occasionally a batch of refined vegetable oil is encountered which does not permit the most efficient drying of microorganisms in that agglomeration of the suspended microorganism aggregates takes place when they have been only partially dried. This is probably due to the presence of insufficient dispersing or wetting agent and can be prevented by including additional dispersing or wetting agent in the suspension.

In my process and in all of the specific examples, the proportions of microorganism solids to oil in the slurry suspension to be treated may be varied over a wide range. The proportion of oil should be sufficient to maintain the suspension in a fluid state throughout the drying operation. The specific examples hereinafter given illustrate proportions that I have found suitable and convenient but I have also found that, subject to the requirements of fluidity, smaller proportions and larger proportions of oil work about equally well. Of course, excessively large proportions of oil are less economical.

The rate of drying of the microorganism by the process of the invention is controlled by such factors as (1) the humidity of the drying gas, (2) the rate at which the drying gas is brought into contact with the microorganism suspension, and (3) the temperature at which the suspension is maintained. Room temperature is satisfactory but it is advantageous to employ the highest temperature which does not damage the microorganism and thereby reduce the amount of gas necessary to produce a satisfactory rate of drying.

The heat employed during the drying of the suspended microorganism may be supplied in any desired manner, such as by heating the gas used to dry the microorganism or by circulating a hot fluid through a jacket surrounding the vessel used for the drying, or by circulating the suspension through an external heat exchanger.

The rate at which the water is removed from the microorganism suspended in the oil or other liquid is a factor which may affect the quality of the dry microorganism product obtained. Suitable rates are hereinafter illustrated and described in connection with the examples.

The wet microorganism employed as the starting material in the drying process of the present invention may contain various amounts of water. While it may be employed in the form of a semi-solid aggregate, it is preferable to use it as a water slurry, because in this form it can be dispersed more readily in the suspending liquid. Molds grow in the form of mycelia which may become tangled. Tangled mycelia are not as readily dispersed as bacteria, which do not grow in the form of mycelia, and therefore generally appear as larger particles which require a longer drying time.

The drying of the suspended microorganism is desirably continued until its moisture content has been reduced to a level of about 10% or less in order to attain significant storage stability at room temperature. Greater storage stability may be attained by reducing the moisture content further, such as to 5% or even to as low as about 1% or 2%.

Upon completion of the drying, the microorganism may be separated from the bulk of the oil or other liquid in which it is suspended in any desired manner, for example, by settling, filtration or centrifuging. In the case of vegetable oils, centrifuging of the microorganism suspension can provide a product with a residual oil content of about 10% or 5% or even less. Residual suspending liquid may be permitted to remain in the product. If desired the level of residual liquid may be reduced by extraction with a suitable solvent to below 1%. When corn oil is employed, solvents such as methylene chloride, hexane or trichloroethylene may be used to extract the residual oil from the dry microorganism without harmful effects. Of course, as those skilled in the art will recognize, other solvents may be employed to extract the residual amounts of suspending liquid from the dry microorganism and the solvent most suitable will vary with the nature of the suspending liquid.

It will be apparent to those skilled in bacteria and mold technology that the basic drying process for bacteria and molds described hereinabove, i.e., involving removal of moisture from bacteria or molds while they are dispersed in a suspending liquid, constitutes a unique approach to the drying of bacteria and molds and has obvious advantages over the prior art drying processes for bacteria and molds.

I have further discovered in the case of some bacteria or molds that if there is present in this basic process a carbohydrate which the microorganism is capable of metabolizing it is possible to obtain a dry product having higher viability than that obtained without the use of a carbohydrate. Under the conditions of my process the carbohydrate appears to protect the delicate microorganism cells from the rigors of dehydration. Suitable carbohydrates include the substantially pure sugars for instance sucrose, dextrose and maltose, and commercial products such as hydrolyzed starch sirups.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

In each of these examples except Example 6, all of the operations were carried out under aseptic conditions.

In each example except Examples 6 and 9 the microorganism suspension subjected to drying was prepared by propagating the microorganisms in a liquid medium, separating them from the bulk of the liquid in a centrifuge, resuspending them in distilled water, centrifuging again, and finally suspending them again in distilled water. At the conclusion of the drying operation, the dried microorganisms were separated from the bulk of the corn oil in a centrifuge or by filtration. Viable microorganisms were determined in the dried preparations and the corresponding undried preparations by standard procedures, involving plating on agar media, incubation at 30° C. and counting the number of colonies that developed from equal weights of microorganism solids. The viability of the microorganisms in the dried preparation is expressed as a percentage obtained from these counts by the formula:

Percent viability $$= \frac{\text{No. of colonies from dried preparation}}{\text{No. of colonies from undried preparation}} \times 100$$

Incubation was carried out for three days in the case of the bacteria and for five days in the case of the molds. Potato dextrose agar was used for the molds and peptone meat extract agar, tomato juice agar, tryptone-glucose-meat extract agar or penassay agar for the bacteria.

In each example, except Examples 6 and 9, the drying apparatus and procedure were as follows:

The drier consisted of a vertical tube 30 inches long and 1¾ inches in inside diameter, sealed at the lower end and fitted at the upper end with a rubber stopper equipped with an air inlet tube extending to the bottom, an air exhaust tube and a tube for withdrawing the dried suspension. A mixture composed of the aqueous microorganism suspension to be dried and 500 ml. of sterilized refined corn oil, with or without sucrose or corn sirup, was placed in the drier which was partially immersed in a constant temperature water bath set at 36° C. to maintain the suspension in the drier at 35° C. Drying was carried out by passing compressed air through the suspension at the rate of 8.85 liters per minute and a gauge pressure of 1.5 pounds per square inch.

*Example 1*

The bacterium dried in this example was a strain of *Streptococcus lactis* (ATCC 7963) which had been propagated at 25° C. in a tomato juice liquid medium. The mixture in the drier was composed of 500 ml. of sterilized refined corn oil, 17.3 ml. of a water suspension of the bacteria containing 0.6 gram of bacteria solids, and 0.6 ml. of a 50% water solution of sucrose. Drying was carried out for three hours. The viability of the bacteria in the dried preparation was 84%.

*Example 2*

The bacterium dried in this example was an unidentified small Gram-positive rod-like bacterium (designated SD-2) which had been isolated from fermented bread dough and propagated at 30° C. in a peptone meat extract liquid medium. The mixture in the drier consisted of 500 ml. of sterilized refined corn oil, 13.6 ml. of a water suspension of the bacteria containing 0.6 gram of bacteria solids, and 0.6 gram of 52 D.E. acid-hydrolyzed corn sirup (100% based on bacteria solids). Drying was carried out for three hours. The viability of the bacteria in the dried preparation was 100%.

*Example 3*

The bacterium dried in this example was an unidentified Gram-positive coccus, characterized by blue-green colony growth on a peptone meat extract agar (designated SD-1), which had been isolated from fermented bread dough and was propagated in a peptone meat extract liquid medium at 30° C. The mixture in the drier consisted of 500 ml. of sterilized refined corn oil, 44.1 ml. of a water suspension of the bacteria containing 0.6 gram of bacteria solids, and 1.2 ml. of a 50% water solution of sucrose. Drying was carried out for four hours. The viability of the bacteria in the dried preparation was 100%.

*Example 4*

The bacterium dried in this example was *Escherichia coli* (ATCC 4163), which had been propagated in a peptone meat extract liquid medium at 30° C. Two corn oil suspensions of this bacterium were dried, each of which was made up of 500 ml. of sterilized refined corn oil and approximately 50 ml. of a water suspension of the bacteria containing 1.0 gram of bacteria solids and one of which contained 1.5 grams of 52 D.E. acid-hydrolyzed corn sirup (150% based on bacteria solids). Drying was carried out in both cases for six hours. The viability of the bacteria dried with the corn sirup was 83% while the viability of the bacteria dried without corn sirup was 77%.

*Example 5*

The bacterium dried in this example was *Bacillus subtilis* (ATCC 6633), which had been propagated in a peptone meat extract liquid medium at 30° C. Two corn oil suspensions of this bacterium were dried, each of which was made up of 500 ml. of sterilized refined corn oil and approximately 50 ml. of a water suspension of the bacteria containing 0.9 gram of bacteria solids and one of which contained 1.35 grams of 52 D.E. acid-hydrolyzed corn sirup (150% based on bacteria solids). Drying was carried out in both cases for six hours. The viability of the bacteria dried with the corn sirup was 86% while the viability of the bacteria dried without corn sirup was 76%.

*Example 6*

A strain of *Bacillus subtilis* (designated #7002) was propagated in a malt extract broth and the bacteria were separated from the wort by centrifugation. The semisolid product containing 33% moisture was mechanically dispersed in unsterilized corn oil in the ratio of 1.0 to 5.3 by weight and the dispersion (total volume 800 cc.) was dehydrated in a cylindrical tank, 8 inches high and 5½ inches in diameter, to 10.4% moisture by sparging compressed air of 14% relative humidity at a rate of about 3 cubic feet per minute for 6 hours through the suspension while maintaining it at 97° F. The dried product was separated from the oil by filtration and was extracted with methylene chloride. The resulting product was an enzymatically active dark red powder, and contained viable cells of *Bacillus subtilis*.

*Example 7*

The bacterium dried in this example was *Sarcina lutea* (ATCC 9341), which had been propagated in Difco "Penassay Broth" at 30° C. Two corn oil suspensions of this bacterium were dried, each of which was made up of 500 grams of sterilized refined corn oil and approximately 50 ml. of a water suspension of the bacteria containing 1.7 grams of bacteria solids and one of which contained 2.55 grams of 52 D.E. acid-hydrolyzed corn sirup (150% based on bacteria solids). Drying was carried out in both cases for six hours. The dried product separated by filtration from the corn oil suspension which contained the corn sirup was found to assay 6.1% moisture and 12.8% corn oil. The viability of the bacteria dried with the corn sirup was 89% while the viability of the bacteria dried without corn sirup was 60%.

*Example 8*

The bacterium dried in this example was *Acetobacter*

*suboxydans* (ATCC 9322), which had been propagated in a tryptone-glucose-yeast extract broth at 30° C. Two corn oil suspensions of this bacterium were dried, each of which was made up of 500 grams of sterilized refined corn oil and approximately 50 ml. of a water suspension of the bacteria containing 3.4 grams of bacteria solids and one of which contained 5.1 grams of 52 D.E. acid-hydrolyzed corn sirup (150% based on bacteria solids). Drying was carried out in both cases for six hours. The viability of the bacteria dried with the corn sirup was 72% while the viability of the bacteria dried without corn sirup was 66%. The dried bacteria products separated by filtration contained 7.3% and 7.5% moisture, and 14.8% and 14.6% corn oil, respectively.

Example 9

A strain of *Bacterium* (*Acetobacter*) *orleanense* (ATCC 9432) was propagated in a tryptone-glucose-yeast extract broth at 30° C. 2640 ml. of the resulting bacteria suspension were centrifuged and the bacteria concentrate so obtained was resuspended in 100 ml. of the supernatant layer. This bacteria suspension, an equal volume of a 40% water solution of sucrose and 1.2 liters of corn oil were mixed and placed in a two-liter resin reaction kettle. This mixture was dried at room temperature by passing air through it for 26½ hours at the rate of 2.25 cubic feet per minute. The dried product was separated from the bulk of the corn oil and was tested for performance in a vinegar generator. It converted alcohol to vinegar at a satisfactory rate.

Example 10

The mold dried in this example was a strain of *Aspergillus niger* (Northern Regional Research Laboratories #330), which had been propagated in a malt extract broth at 30° C. Two corn oil suspensions of this mold were dried, each of which was made up of 500 grams of sterilized corn oil and approximately 50 ml. of a water suspension of the mold containing 2.1 grams of mold solids (mixture of mycelia and spores) and one of which contained 3.15 grams of 52 D.E. acid-hydrolyzed corn sirup (150% based on mold solids). Drying was carried out in both cases for 18 hours. The viability of the mold dried with the corn sirup was 100% while the viability of the mold dried without corn sirup was 50%. The dried mold products separated by filtration contained 8.4% and 5.8% moisture, and 25.0% and 35.1% corn oil, respectively

Example 11

The mold dried in this example was a strain of *Mucor genevensis* (designated #8544), which had been propagated in a malt extract broth at 30° C. Two corn oil suspensions of this mold were dried, each of which was made up of 500 grams of sterilized refined corn oil and approximately 50 ml. of a water suspension of the mold containing 2.0 grams of mold solids (mixture of mycelia and spores) and one of which contained 3.0 grams of 52 D.E. acid-hydrolyzed corn sirup (150% based on mold solids). Drying was carried out in both cases for 18 hours. The viability of the mold dried with the corn sirup was 88% while the viability of the mold dried without corn sirup was 57%.

Example 12

The mold dried in this example was a strain of *Penicillium notatum* (ATCC 9178), which had been propagated in a malt extract broth at 30° C. Two corn oil suspensions of this mold were dried, each of which was made up of 500 grams of sterilized refined corn oil and approximately 50 ml. of a water suspension of the mold containing 3.5 grams of mold solids (mixture of mycelia and spores) and one of which contained 5.25 grams of 52 D.E. acid-hydrolyzed corn sirup (150% based on mold solids). Drying was carried out in both cases for 18 hours. The viability of the mold dried with the corn sirup was 95% while the viability of the mold dried without corn sirup was 56%. The dried mold products separated by filtration contained 3.8% and 5.5% moisture and 15.5% and 20.9% corn oil, respectively.

Example 13

The mold dried in this example was a strain of *Streptomyces griseus* (ATCC 10137), which had been propagated in a peptone-glucose-meat extract broth at 30° C. Two corn oil suspensions of this mold were dried, each of which was made up of 500 grams of sterilized refined corn oil and approximately 50 ml. of a water suspension of the mold containing 1.8 grams of mold solids (mixture of mycelia and spores) and one of which contained 2.7 grams of 52 D.E. acid-hydrolyzed corn sirup (150% based on mold solids). Drying was carried out in both cases for 18 hours. The viability of the mold dried with the corn sirup was 100% while the viability of the mold dried without corn sirup was 60%. The mold product dried with corn sirup, after separation by filtration, contained 7.8% moisture and 7.0% corn oil.

In the foregoing examples except Example 6 all of the operations were carried out under aseptic conditions because it was desired to determine the effect of the drying on the viability of each microorganism. Of course, aseptic drying conditions would not ordinarily be required for many purposes.

The process of the present invention has a number of advantages over the prior art processes for dehydration of microorganisms. It provides dried microorganisms of higher viability and therefore higher functional activity. Drying temperature and drying rate can be controlled more easily and more accurately.

Freeze-drying is today perhaps the most widely used procedure for dehydration of microorganisms. Freeze-drying is inferior to the drying process of the present invention in that it is costly and inefficient because very large freezing surfaces are required relative to the amount of material dried and maintenance of freezing temperatures and high vacuum for large-scale operations is both difficult and expensive. Freeze-drying requires the use of so-called "protective" materials if viabilities of more than about 5% are to be achieved. This is shown clearly by the work of Record and Taylor (J. Gen. Microbiol., vol. 9, p. 475, 1953) who freeze-dried strains of *Escherichia coli* suspended in water and obtained viabilities of 0.006 to 1.47; inclusion of glucose and an exudate from *Escherichia coli* in the drying mass resulted in a top viability of 51%. In comparison for example, *Escherichia coli* dried by the process of the present invention without addition of a protective material, had a viability of 77% and three other bacterial cultures dried without additive (*Bacillus subtilis*, *Sarcina lutea* and *Acetobacter suboxydans*) had viabilities of 60 to 77%. Similarly, Naylor and Smith (J. Bact., vol. 52, p. 565, 1946) reported that *Serratia marcescens* freeze-dried without additive had a viability of less than 5% (usually less than 1%) but up to 100% when additives (thiourea, ascorbic acid, ammonium chloride and dextrin) were present. These data indicate that whereas in freeze-drying protective substances are an absolute necessity, in the drying process of the present invention, they are not needed to obtain good results with many microorganisms.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

This application is a continuation-in-part of my co-pending application Serial No. 582,909, filed May 7, 1956, now U.S. Patent 2,929,150.

I claim:

1. A process of preparing viable dry microorganisms which comprises suspending a wet microorganism of the group consisting of bacteria and molds in a live state in a medium not harmful to the microorganism which is liquid at the drying temperature both in the presence and the absence of water and then drying the microorganism by evaporating water from the suspension while maintaining the microorganism in suspension in said liquid and while maintaining the temperature of the suspension below that to which the microorganism is sensitive.

2. The process as defined by claim 1 wherein the water is evaporated by bringing the microorganism suspension into intimate contact with a gas not harmful to the microorganism.

3. The process as defined by claim 1 wherein the water is evaporated from the microorganism by passing through the microorganism suspension a stream of gas not harmful to the microorganism.

4. The process as defined by claim 1 wherein the medium is an oil.

5. The process as defined by claim 3 wherein the medium is an oil.

6. The process as defined by claim 3 wherein the medium is a glyceridic oil and the gas is air.

7. The process as defined by claim 4 with the added step of separating at least some of the oil from the microorganism after drying.

8. A process of preparing viable dry microorganisms which comprises suspending a wet microorganism of the group consisting of bacteria and molds in a live state in a vegetable oil and then drying the microorganism by evaporating water from the suspension by bringing the suspension into intimate contact with air while maintaining the microorganism in suspension in said oil and while maintaining the temperature of the suspension below that to which the microorganism is sensitive.

9. A process of preparing viable dry microorganisms which comprises suspending a wet microorganism of the group consisting of bacteria and molds in a live state in corn oil, evaporating moisture from the suspension with air until the moisture content of the microorganism is reduced below about 10% while maintaining the microorganism in suspension in the oil and while maintaining the temperature of the suspension below that to which the microorganism is sensitive, and then separating the bulk of the oil from the dried microorganism.

10. A process of preparing viable dry microorganisms which comprises suspending a wet microorganism of the group consisting of bacteria and molds in a live state, and a carbohydrate, which the microorganism is capable of metabolizing, in a medium not harmful to the microorganism which is liquid at the drying temperature both in the presence and absence of water and then drying the microorganism by evaporating water from said suspension by bringing the suspension into intimate contact with a gas not harmful to the microorganism while maintaining the microorganism in suspension in said liquid and while maintaining the temperature of the suspension below that to which the microorganism is sensitive.

11. The process as defined by claim 10 wherein the gas is air.

12. The process as defined by claim 10 wherein the medium is an oil.

13. The process as defined by claim 12 wherein the oil is a vegetable oil.

14. A process of preparing viable dry microorganisms which comprises suspending a wet microorganism of the group consisting of bacteria and molds in a live state and sucrose in a vegetable oil and then drying the microorganism by evaporating water from the suspension by bringing the suspension into intimate contact with air while maintaining the microorganism in suspension in said oil and while maintaining the temperature of the suspension below that to which the microorganism is sensitive.

15. A process of preparing viable dry microorganisms which comprises suspending a wet microorganism of the group consisting of bacteria and molds in a live state and a hydrolyzed starch sirup in a vegetable oil and then drying the microorganism by evaporating water from the suspension by bringing the suspension into intimate contact with air while maintaining the microorganism in suspension in said oil and while maintaining the temperature of the suspension below that to which the microorganism is sensitive.

16. The process as defined by claim 15 wherein the hydrolyzed starch sirup is corn sirup.

17. A process of preparing viable dry bacteria which comprises suspending wet bacteria in a live state in an oil and then drying the bacteria by evaporating water from the suspension by bringing the suspension into intimate contact with air while maintaining the bacteria in suspension in said oil and while maintaining the temperature of the suspension below that to which the bacteria are sensitive.

18. A process of preparing viable dry molds which comprises suspending wet molds in a live state in an oil and then drying the molds by evaporating water from the suspension by bringing the suspension into intimate contact with air while maintaining the molds in suspension in said oil and while maintaining the temperature of the suspension below that to which the molds are sensitive.

References Cited in the file of this patent

UNITED STATES PATENTS

| | | |
|---|---|---|
| 2,459,903 | Voorhees | Jan. 25, 1949 |
| 2,555,945 | Thomsen | June 5, 1951 |
| 2,710,810 | Strashun | June 14, 1951 |